Feb. 9, 1960

A. W. SIMPSON 2,924,814

STORAGE DEVICES

Filed July 20, 1955

INVENTOR
ANTHONY W. SIMPSON
BY Greene, Pineles and Durr
ATTORNEY

United States Patent Office 2,924,814
Patented Feb. 9, 1960

2,924,814

STORAGE DEVICES

Anthony W. Simpson, Radcliffe-on-Trent, England, assignor to The Plessey Company Limited, Ilford, England, a British company Application July 20, 1955, Serial No. 523,342

Claims priority, application Great Britain July 26, 1954

3 Claims. (Cl. 340—173)

This invention relates to a device for storing an electrical signal in the form of a train of pulses and to apparatus incorporating the device. The signal may represent a digit, the number of pulses being equal to the digit represented. One use of a storage device in accordance with the invention, is in the type of digital computer based on decimal counting tubes, particularly a computer using high speed vacuum tubes such as the L. M. Ericsson trochotron AD3 or the Philips EIT valve.

An important feature of the invention is the use of ferroelectric materials, particularly single crystals of pure barium titanate have a rectangular polarization/field hysteresis loop. This property enables such materials to be used in the storing of information according to a binary code, the two possible states of remanance being used to denote "0" and "1" respectively. It is possible to detect which of the two possible states the material is in as follows. A condenser employing the ferroelectric material as dielectric is connected in series with an ordinary condenser of comparatively large capacitance. If a voltage pulse is applied across the two condensers, the voltage developed across, the larger condenser will depend upon the state of the ferroelectric material. If the state of the latter is such that the voltage pulse drives it towards saturation the change in polarization is negligible because the portion of the hysteresis loop concerned is almost horizontal, hence the charge flowing into the large condenser is negligible. On the other hand, if the state of the ferroelectric material is such that the voltage pulse takes the state of the material round the hysteresis loop through coercivity to saturation in the opposite sense, then a large change in polarization results with the development of a corresponding large voltage across the ordinary condenser.

The value of the voltage required to produce the sudden release of charge depends only on the coercive field of the ferroelectric material and on the thickness of that material between the plates of the condenser.

A storage device can be constructed from a plurality of condensers, all employing the same type of ferroelectric material but differing slightly in thickness. These condensers are connected in parallel and this parallel combination is connected in series with an ordinary condenser having a capacitance greater than any one of the ferroelectric condensers. Consider what occurs if, with all the condensers initially polarized in the same sense, a steadily increasing voltage is applied across the circuit, the voltage being such as tends to reverse the sense of polarization. As the voltage is increased, the thinnest condenser will be first to experience a field sufficient to reverse its state of polarization, then the next thinnest will reverse and so on.

Figures 1, 2:
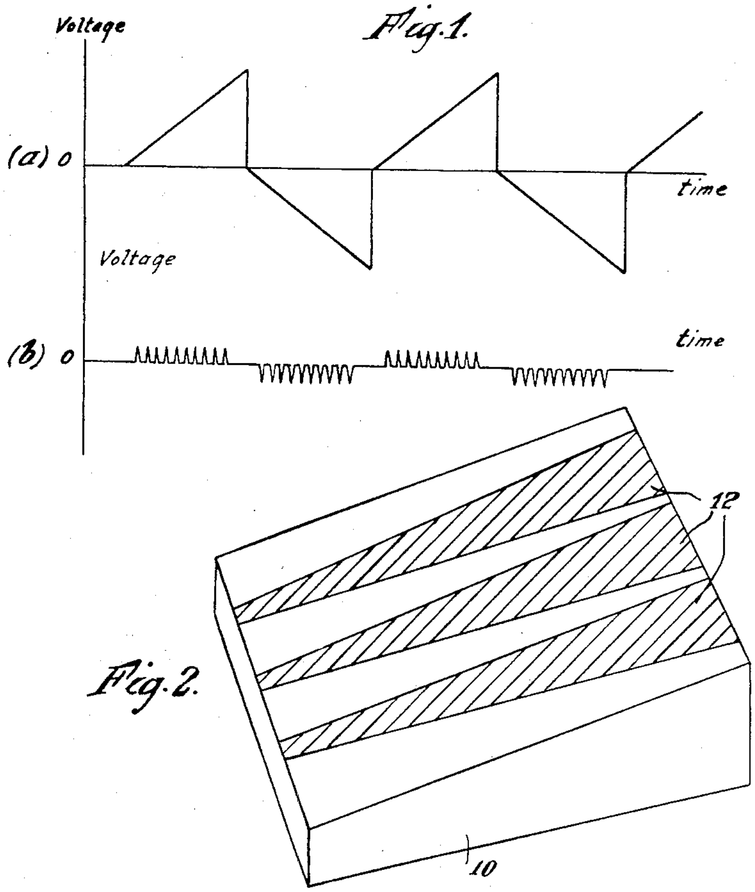
Fig. 1 is a graph comparing input and output voltages in a device made according to the invention.
Fig. 2 is a perspective view of a set of condensers made according to the invention.

Each reversal will produce a sudden increase in voltage across the large condenser. By connecting a resistor of suitable value across the large condenser, it can be arranged for an output pulse to be produced for each reversal. In Figure 1 of the accompanying drawing there is shown at (*a*) a sawtooth input voltage and at (*b*) the corresponding output voltage, it being assumed that there are ten ferroelectric condensers of different thickness and that the peak value of sawtooth voltage is sufficient to reverse the state of polarization of the thickest of these ten condensers.

In order to store a digit, a sawtooth voltage is applied to the condensers until a number of pulses equal to the digit have been produced across the large condenser. The sawtooth voltage is then switched off and a number of condensers corresponding to the digit to be stored are left with their polarization reversed. The stored digit can be read out by applying a sawtooth voltage of opposite polarity, the number of pulses produced during a complete sweep being equal to the digit. The above operations can be performed by means of a circuit similar to that described in my copending application Serial No. 523,343, filed July 20, 1955, now Patent No. 2,870,433.

Figure 3:
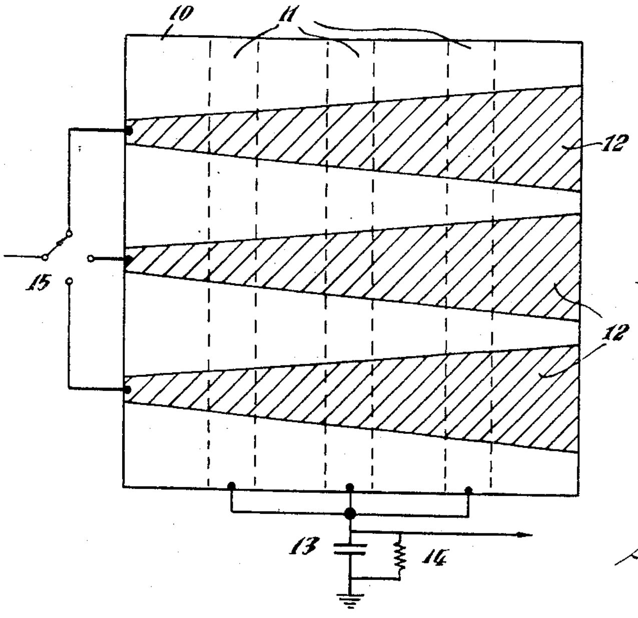
Fig. 3 is a plan view, partly diagrammatic, of a circuit comprising the set of condensers of Fig. 2.

A convenient constructional form of ferroelectric condenser is shown diagrammatically in Figures 2 and 3 of the accompanying drawings. Figure 2 is a perspective view of the condenser arrangement and Figure 3 is a plan view in which certain circuit details are also shown. The illustrated arrangement comprises three sets of condensers, each set consisting of three condensers of different thicknesses.

The condenser arrangement comprises a thin wedge-shaped sheet 10 of a ferroelectric material with a square or rectangular hysteresis loop. In the case of a single crystal, this can be produced by slowly and steadily lifting a parallel sided sheet out of an etching solution. A series of electrodes are silvered onto opposite faces of the sheet. The electrodes 11 on one face being in the form of parallel strips (see dotted lines of Fig. 3), while the electrodes 12 on the other face run at right angles to electrodes 11 and each decreases in width from the thick end to the thin end of the sheet 10. The electrodes 12 are tapered in this way so that although the thicknesses of the three condensers of each set differ, their capacitances are the same.

The three electrodes 11 are connected in common to a condenser 13 of large capacitance in parallel with a resistor 14, the output pulses being developed across this parallel combination. The input sawtooth voltage is applied to any one of the three sets of condensers by means of a switch 15.

For use in a decimal computor, ten condensers are provided in each set, i.e. there would be ten electrodes 11, the number of sets of condensers being determined by the number of electrodes 12 that can be conveniently provided. The arrangement enables a large number of decimal digits to be stored in a comparatively small space.

It will be appreciated that the constructional and circuit details given above can be modified in various respects without departing from the scope of the invention.

I claim:

1. In a device for storing an electric signal in the form of a train of pulses, a set of condensers comprising a wedge shaped ferroelectric plate consisting essentially of a ferroelectric material having a substantially square type of hysteresis loop, a plurality of conductive coating strips on a first side of said plate, a plurality of conductive coating strips on the opposite side of said plate extending at an angle to the strips on the first side thereof, whereby separate parallel connected condensers are formed where strip portions on opposite side of the plate cross each other.

2. In a device as set forth in claim 1, wherein said dielectric plate is wedge shaped in the direction of one of said set of strips.

3. In a device as set forth in claim 1, comprising an additional condenser of larger capacitance than any one of said condensers of said set connected in series with the condensers of said set, a resistance connected across said additional condenser whereby a pulse produced by reversing the state of polarization of one or more of said condensers of said set can be read out across said resistance.

References Cited in the file of this patent

UNITED STATES PATENTS

| | | |
|---|---|---|
| 2,460,534 | Richards | Feb. 1, 1949 |
| 2,717,372 | Anderson | Sept. 6, 1955 |
| 2,717,373 | Anderson | Sept. 6. 1955 |
| 2,858,490 | Simkulet et al. | Oct. 28, 1958 |

FOREIGN PATENTS

| | | |
|---|---|---|
| 454,845 | Great Britain | Oct. 5, 1936 |